United States Patent
Gupta et al.

(10) Patent No.: US 10,827,542 B2
(45) Date of Patent: Nov. 3, 2020

(54) CELLULAR IOT CONTROL AND USER PLANE SWITCHING

(71) Applicant: Apple Inc., Cupertino, CA (US)

(72) Inventors: Vivek G. Gupta, San Jose, CA (US); Puneet Jain, Hillsboro, OR (US); Robert Zaus, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/073,997

(22) PCT Filed: Sep. 30, 2016

(86) PCT No.: PCT/US2016/055040
§ 371 (c)(1),
(2) Date: Jul. 30, 2018

(87) PCT Pub. No.: WO2017/189038
PCT Pub. Date: Nov. 2, 2017

(65) Prior Publication Data
US 2019/0045561 A1  Feb. 7, 2019

Related U.S. Application Data

(60) Provisional application No. 62/329,912, filed on Apr. 29, 2016.

(51) Int. Cl.
*H04W 76/12* (2018.01)
*H04L 29/08* (2006.01)
(Continued)

(52) U.S. Cl.
CPC .............. *H04W 76/12* (2018.02); *H04L 67/12* (2013.01); *H04L 67/125* (2013.01); *H04W 4/70* (2018.02);
(Continued)

(58) Field of Classification Search
CPC ..... H04W 76/12; H04W 76/25; H04W 76/22; H04W 4/70; H04W 76/27; H04L 67/125
See application file for complete search history.

(56) References Cited

U.S. PATENT DOCUMENTS

| | | | |
|---|---|---|---|
| 2010/0165940 A1* | 7/2010 | Watfa | H04W 8/08 370/329 |
| 2012/0069731 A1* | 3/2012 | Tooher | H04W 76/16 370/221 |

(Continued)

OTHER PUBLICATIONS

International Search Report and Written Opinion for PCT/US2016/055040 dated Dec. 12, 2016.
(Continued)

*Primary Examiner* — Candal Elpenord
(74) *Attorney, Agent, or Firm* — Eschweiler & Potashnik, LLC

(57) ABSTRACT

Simultaneous control plane and user plane user data transfer, for CIoT devices, and switching between control plane and user plane data transfer, for the CIoT devices, may be performed for Control Plane CIoT EPS Optimization and user plane data transmission. In one implementation, a flag value is set within a Non-Access-Stratum (NAS) EPS Mobility Management (EMM) message to indicate to the network to establish a user plane connection (e.g., an S1-U bearer and data radio bearer (DRB)). The NAS message may be transmitted when the user device is in connected mode of operation.

18 Claims, 8 Drawing Sheets

(51) Int. Cl.
  *H04W 76/22* (2018.01)
  *H04W 76/25* (2018.01)
  *H04W 4/70* (2018.01)
  *H04W 76/27* (2018.01)
(52) U.S. Cl.
  CPC .......... *H04W 76/22* (2018.02); *H04W 76/25* (2018.02); *H04W 76/27* (2018.02)

(56) References Cited

U.S. PATENT DOCUMENTS

| | | | |
|---|---|---|---|
| 2017/0048112 A1* | 2/2017 | Ronneke | H04L 41/12 |
| 2017/0202003 A1* | 7/2017 | Johansson | H04W 72/10 |
| 2018/0184246 A1* | 6/2018 | Ryu | H04W 8/02 |
| 2018/0352593 A1* | 12/2018 | Velev | H04W 24/08 |
| 2019/0014530 A1* | 1/2019 | Aghili | H04W 48/08 |
| 2019/0104455 A1* | 4/2019 | Park | H04W 76/20 |
| 2019/0116483 A1* | 4/2019 | Ryu | H04W 60/04 |
| 2019/0116519 A1* | 4/2019 | Park | H04W 92/04 |
| 2019/0141563 A1* | 5/2019 | Ianev | H04W 4/70 |
| 2020/0128463 A1* | 4/2020 | Reddiboyana | H04W 76/15 |

OTHER PUBLICATIONS

QUALCOMM Incorporated et al: 1-24 11 "Simultaneous support for CP and UP optimisation", 3GPP Draft; S2-162056-23 401 CR CIOT Simultaneous Support CP and UP-R9, 3rd Generation Partnership Project (3GPP), Mobile Competence Centre; 650, Route Des L. Ucioles; F-06921 Sophia-Antipolis Cedex; pp. 2 and 23-24.
"3rd Generation Partnership Project; Technical Specification Group Core Network and Terminals; Non-Access-Stratum (NAS) protocol for Evolved Packet System (EPS); Stage 3 (Release 12)"; 3GPP Standard; 3GPP TS 24.301, 3rd Generation Partnership Project (3GPP); Mobile Competence Centre; 650, Route Des Lucioles ; F-06921 Sophia-Antipolis Cedex; p. 169.
Huawei Hisilicon: "Discussion on enabling to switch from CP to UP CioT EPS optimization"; 3GPP Draft; C1A160052-CIOT-Disc-Enabling-Switching-From-CP-To-UP, 3rd Generation Partnership Project (3GPP), Mobile Competence Centre; 650, Route Des Lucioles ; F-06921 Sophia-Antipolis Cedex; France; whole document.

* cited by examiner

CELLULAR IOT CONTROL AND USER PLANE SWITCHING

RELATED APPLICATIONS

The present application claims the benefit of U.S. Provisional Patent Application No. 62/329,912, which was filed on Apr. 29, 2016, the contents of which are hereby incorporated by reference as though fully set forth herein; and of PCT Application PCT/US16/55040, which was filed on Sep. 30, 2016, the contents of which are hereby incorporated by reference as though fully set forth herein.

BACKGROUND

Cellular wireless networks may be used as a platform for Internet of Things (IoT) connectivity, which may also be referred to as Cellular-based IoT (CIoT). The extensive footprint, high reliability, and security features of wireless cellular networks can be ideal for servicing IoT devices.

Many CIoT devices perform relatively infrequent small data transmissions. CIoT devices may generally be characterized as using low bandwidth and non-urgent communications. CIoT devices may include sensor devices (e.g., a temperature sensor, a utility meter reading device, etc.) that are designed to take a measurement and then upload the measurement. For such devices, Narrowband IoT (NB-IoT) techniques, as described in the Third Generation Partnership Project (3GPP) specifications, may be used to communicate with the IoT devices.

The 3GPP standards permit CIoT devices to transmit data in both the control plane and the user plane. There may be a number of reasons for a CIoT device to selectively transmit substantive data (e.g., measurements taken by sensors of the CIoT device) in the control plane or the user plane. For example, small amounts of data may be efficiently transmitted in the control plane without requiring user plane bearer connections to be established. For larger amounts of data, however, the data transfer may need to be made in the user plane.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

To support CIoT, 3GPP operators may need to address usage scenarios for devices that are power efficient (e.g., battery life of several years), can be reached in challenging coverage conditions (e.g. indoors and in basements), are cheap enough so that they can be deployed on a mass scale, and/or may be disposable. Release 13 of the 3GPP standard includes architecture enhancements to support highly efficient handling of small data transmissions with minimized overhead for system signaling. Additionally, the architecture may support power consumption optimizations and simplified mobility and session management procedures. More particularly, in Release 13 of the 3GPP standard, two solutions are defined for small data transfer: control plane Evolved Packet System (EPS) data transfer, and user plan EPS data transfer. In both the control plane and the user plane data transfer, optimizations are implemented for CIoT devices, referred to herein as Control Plane CIoT EPS Optimization and User Plane CIoT EPS Optimization.

Techniques are described herein to support simultaneous control plane and user plane data transfer, for CIoT devices, and to support switching between control plane and user plane data transfer. In one implementation, a flag value is set within a Non-Access-Stratum (NAS) EPS Mobility Management (EMM) message to indicate to the network to establish a user plane connection (e.g., an S1-U bearer and data radio bearer (DRB)). The NAS message may be transmitted when the user device is in a connected mode of operation.

Figure 1:
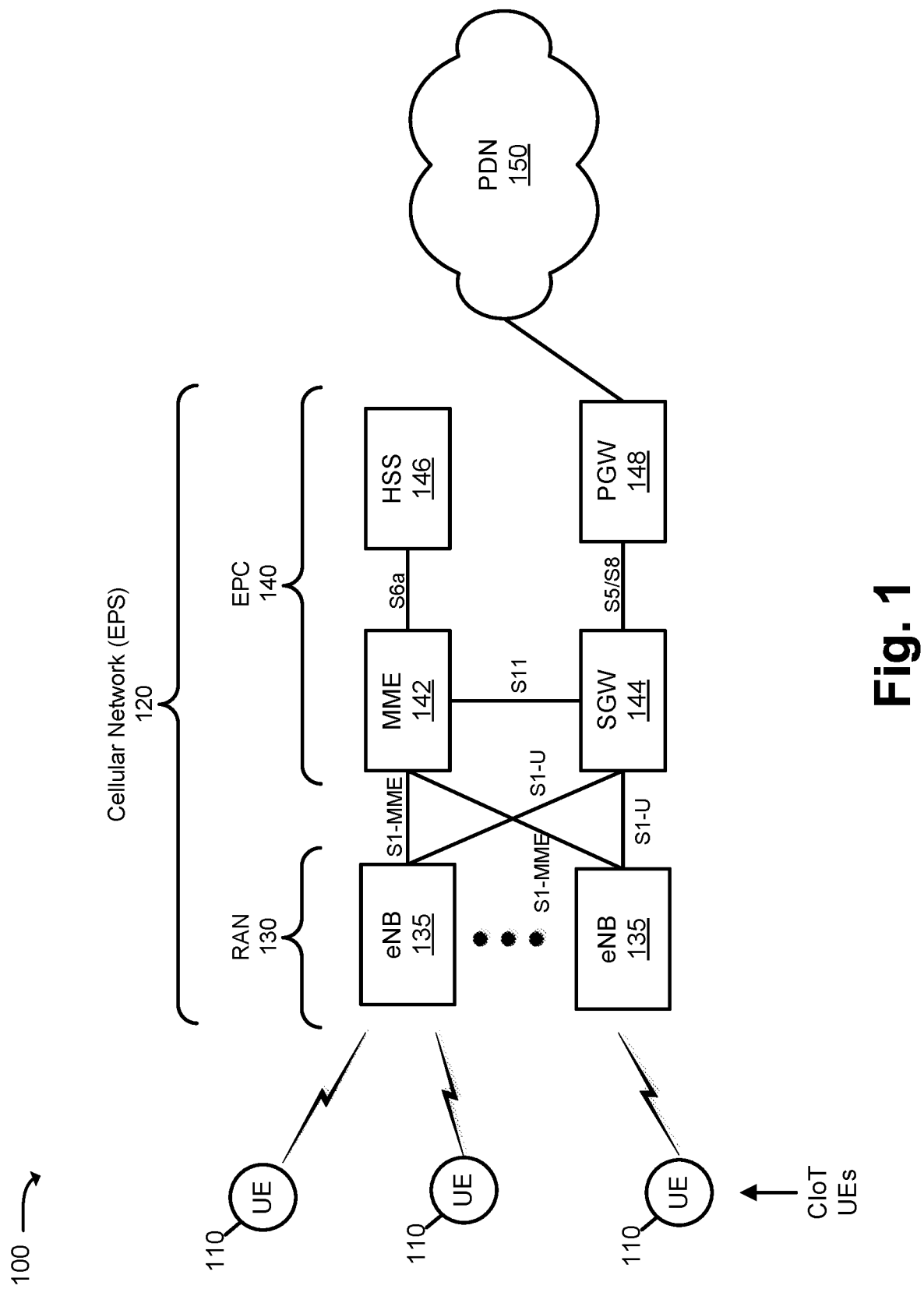
FIG. 1 is a diagram illustrating an example system in which systems and/or methods described herein may be implemented.

FIG. 1 is a diagram illustrating an example system 100 in which systems and/or methods described herein may be implemented. As illustrated, system 100 may include a number of User Equipment (UEs) 110, which may obtain network connectivity from cellular network 120. In 3GPP, cellular network 120 may include both the Radio Access Network (RAN) 130 and the core portion of the cellular network, which may be referred to as the Evolved Packet Core (EPC) 140. The techniques described herein may be particularly useful for supporting machine type communications, such as for supporting uplink or downlink transmissions for CIoT devices (which may also be referred to as Machine Type Communication (MTC) devices or NB-IoT devices). Accordingly, in the description that follows, UEs 110 may particularly include these devices. However, the techniques described herein may also be applicable to non-CIoT UEs.

RAN 130 may particularly include base stations, which, in the context of a 3GPP network, may be referred to as Evolved NodeBs (eNBs) 135. eNBs 135 may provide the air (radio) interface for wireless connections with UEs 110. EPC 140 may include an Internet Protocol ("IP")-based network. EPC 140 may include a number of network devices, including a Mobility Management Entity (MME)

142, a Serving Gateway (SGW) 144, a Home Subscriber Server (HSS) 146, and a packet data network gateway (PGW 148). Through EPC 140, UEs 110 may communicate with an external network, such as packet data network (PDN) 150. For example, an operator of a network of IoT devices may control and/or collect data, from the IoT devices, using one or more application servers that are connected to PDN 150.

UEs 110, as IoT devices, may each include a device that may implement one or more sensing components and a communication component. The sensing component may include, for example, a temperature sensor, a humidity sensor, a light sensor, a camera, a video camera, a geo-positioning element (e.g., a GPS component), and/or other sensors that generate or monitor data that relates to the environment of UE 110. The communication component may include a wireless or wired communication circuit that UE 110 may use to transmit the sensed data to another IoT device and/or to cellular network 120. For example, the communication component may include a cellular radio.

Although not shown in FIG. 1, in a typical implementation, UEs that include user mobile devices, such as cellular telephones, may be present and connect to cellular wireless network 120. That is, wireless cellular network 120 may be operated to provide communications services to both CIoT devices and user mobile devices.

eNBs 135 may each include one or more network devices that receive, process, and/or transmit traffic destined for and/or received from UE 110 (e.g., via an air interface). eNBs 135 may include antennas and other logic necessary to wirelessly communicate with UEs 110. eNBs 135 may additionally communicate with other network devices in the core portion of the wireless telecommunications network. Although referred to as an "eNB," eNB 135 may generally represent any base station and/or RAT node that is implemented in a cellular network as a network device designed to wirelessly communicate with UEs.

MME 142 may include one or more computation and communication devices that act as a control node for eNBs 135 and/or other devices that provide the air interface for the wireless telecommunications network. For example, MME 142 may perform operations to register UEs 110 with the cellular network, to establish user plane bearer channels (e.g., traffic flows), to hand off UE 110 to different eNBs 135, MME, or another network, and/or to perform other operations. MME 142 may perform policing operations on traffic destined for and/or received from UEs 110.

SGW 144 may aggregate traffic received from one or more eNBs 135 and may send the aggregated traffic to an external network or device via PGW 148. Additionally, SGW 144 may aggregate traffic received from one or more PGWs 148 and may send the aggregated traffic to one or more eNBs 135. SGW 144 may operate as an anchor for the user plane during inter-eNB handovers and as an anchor for mobility between different telecommunication networks.

HSS 146 may include one or more devices that may manage, update, and/or store, in a memory associated with HSS 146, profile information associated with a subscriber (e.g., a subscriber associated with UE 110). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with UE 110. Additionally, or alternatively, HSS 146 may perform authentication, authorization, and/or accounting operations associated with the subscriber and/or a communication session with UE 110.

PGW 148 may include one or more network devices that may aggregate traffic received from one or more SGWs 144, and may send the aggregated traffic to an external network. PGW 148 may also, or alternatively, receive traffic from the external network and may send the traffic toward UE 110 (via SGW 144 and/or eNB 135).

PDN 150 may include one or more packet networks, such as an Internet Protocol (IP) based packet network. PDN 150 may include a wide area network (WAN), a local area network (LAN), and/or combinations of WANs and LANs. Application servers or other computing devices, designed to control or aggregate data from UEs 110, may be connected to PDN 150.

A number of communication interfaces, between the various components of system 100, are illustrated in FIG. 1. The communication interfaces may include 3GPP standardized interfaces. As illustrated, the interfaces may include: an S1-U interface between eNB 135 and SGW 144, an S1-MME interface between eNB 135 and MME 142, an S6a interface between MME 142 and HSS 146, and an S5/S8 interface between SGW 144 and PGW 148.

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Alternatively, or additionally, one or more of the devices of system 100 may perform one or more functions described as being performed by another one or more of the devices of system 100.

Figure 2:
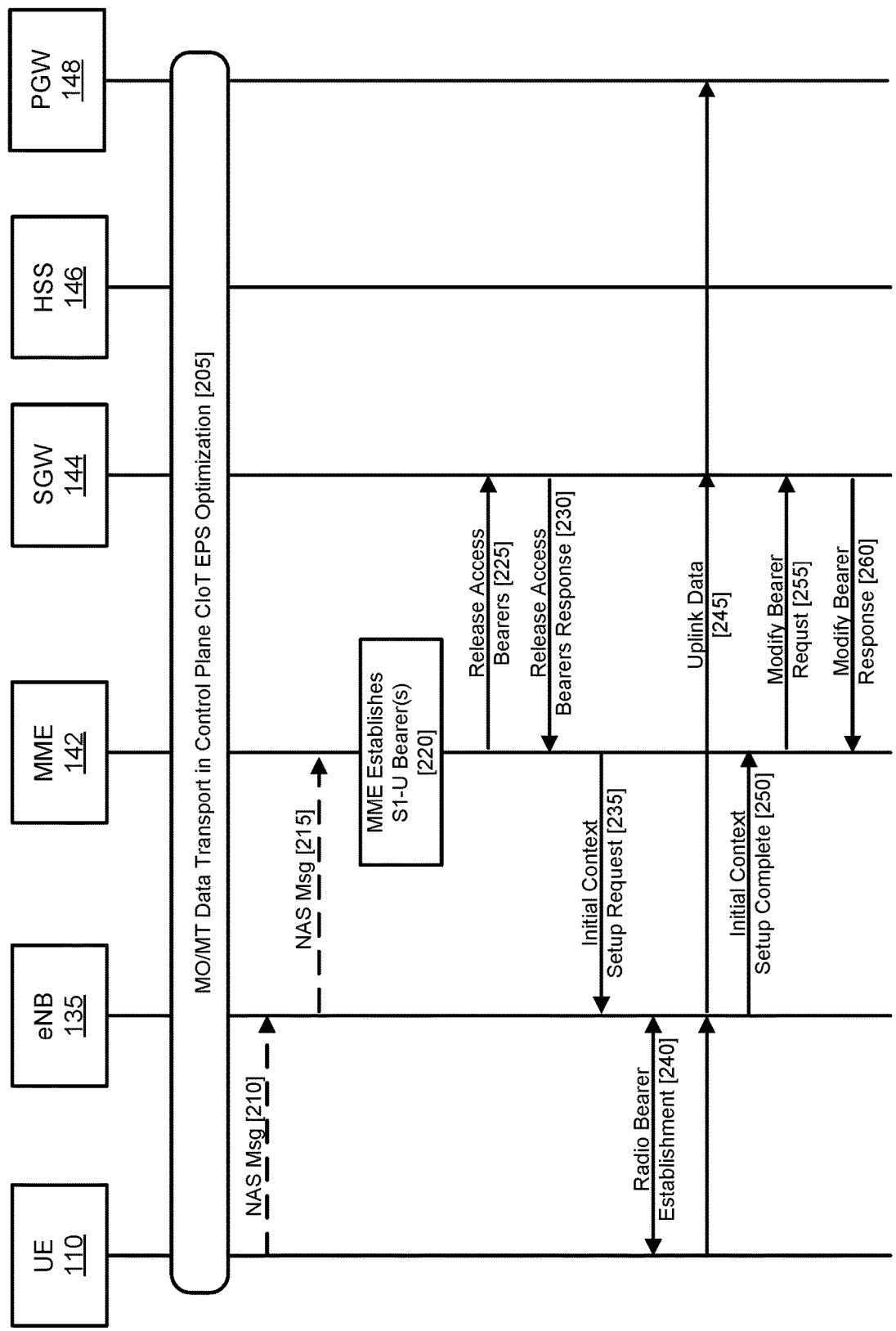
FIG. 2 is a diagram illustrating a signaling sequence to enable the switching from using control plane optimized CIoT data transfer ("Control Plane CIoT EPS Optimization") to using user plane CIoT data transfer.

FIG. 2 is a diagram illustrating a signaling sequence to enable the switching from using control plane optimized CIoT data transfer to using user plane data transfer. As shown in FIG. 2, UE 110 may be engaged in mobile originated (MO) and/or mobile terminated (MT) data communication using the control plane (at 205). The data communications may be particularly implemented, in the control plane, using the Control Plane CIoT EPS Optimization procedure, as described in the 3GPP Technical Specification (TS) 24.301 (Release 13). Under Control Plane CIoT EPS Optimization, user data may be transported by the MME by encapsulating user data in NAS protocol data units (PDUs), which may reduce the total number of control plane messages when handling short data communications. Additionally, in Control Plane CIoT EPS Optimization, the data may be transmitted using NAS security keys and without using Access Stratum (AS) security keys.

At some point, UE 110 may determine to communicate data using user plane communications (e.g., via user plane data transfer). The switch from the control Plane CIoT EPS Optimization to user plane data transfer may be signaled using an explicit NAS message. In particular, a NAS message may be transmitted between UE 110 and eNB 135 (at 210). The NAS message may be encapsulated in a Radio Resource Control (RRC) message to eNB 135. eNB 135 may forward the NAS messages to MME 142 (at 215). When MME 142 receives the NAS message, MME 142 may control the establishment of S1-U bearers to execute the data transfer for UE 110 (at 220, and as shown at 225-260).

MME 142, in order to minimize the possible occurrence of out of order downlink data, may send a Release Access Bearers Request message (at 225). SGW 144, in response, may release MME related information and respond with a Release Access Bearers Response message (at 230).

MME 142 may further send an Initial Context Setup Request to eNB 135 (at 235). eNB 135 may, in response, establish the radio bearers with UE 110 (at 240). Uplink data from UE 110 may now be forwarded by eNB 135 to SGW 144. SGW 144 may forward the uplink data to PGW 148 (at 245)

eNB 135 may send a S1-AP message Initial Context Setup Complete message to MME 142 (at 250). MME 142 may send a Modify Bearer Request message to SGW 144 (at 255). SGW 144 may return a Modify Bearer Response message (at 260). At this point, downlink data may now be able to be sent to UE 110.

Figure 3:
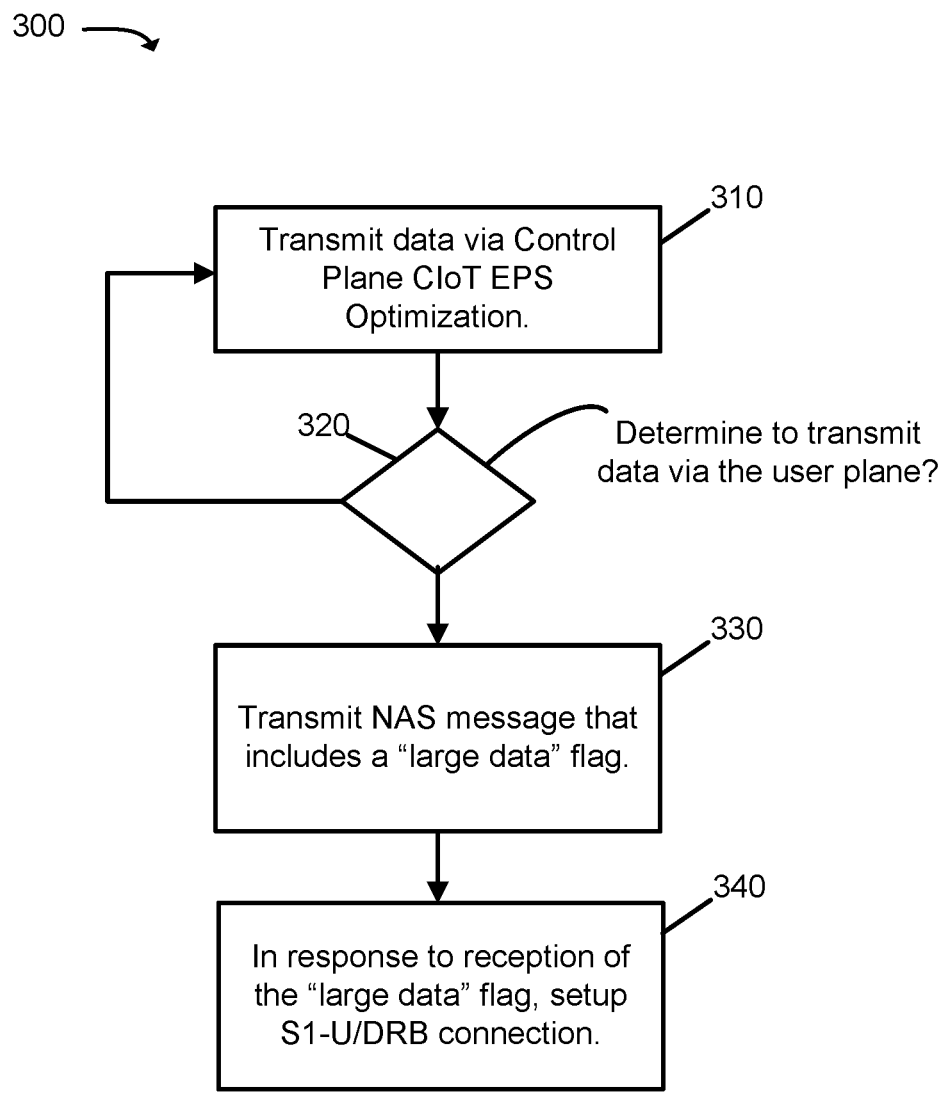
FIG. 3 is a flowchart illustrating an example process relating to switching from data transfer using Control Plane CIoT EPS Optimization to data transfer using the user plane.

FIG. 3 is a flowchart illustrating an example process 300 relating to switching (or simultaneously using) from data transfer using Control Plane CIoT EPS Optimization to data transfer using the user plane. Process 300 may be performed by, for example, UE 110 in conjunction with MME 142.

Initially, a UE may be transmitting data via Control Plane CIoT EPS Optimization (block 310). As previously mentioned, transmitting data via Control Plane CIoT EPS Optimization may include encapsulating substantive data (e.g., measurements made by an IoT UE) in messages that are transmitted as control plane messages in EPC 140. For small or infrequent data transfers, using Control Plane CIoT EPS Optimization may be more efficient than creating data radio bearers (DRBs). At some point, UE may determine to transition to transmitting data using user plane data transfer (block 320). Alternatively, the UE may determine to begin using user plane data transfer while potentially continuing to use Control Plane CIoT EPS Optimization. For example, UE 110 may determine that, based on the amount of data that is to be transmitted by UE 110, performing the data transmission using user plane data transfer would be more efficient. Alternatively or additionally, the decision to transition from using Control Plane CIoT EPS Optimization to user plane data transfer may be made by a device other than the UE. For example, a network device, such as MME 142 or SGW 144 may make the decision.

Process 300 may further include transmitting a NAS message, including a "large data" flag (block 330). In one implementation, UE 110 may transmit a NAS message, to MME 142. The message may be a particular message (e.g., a "Data Service Request" message) that includes a number of potential information elements (IEs). The particular message may be a EPS Mobility Management (EMM) message. One of the IEs may include a flag section to indicate that the UE is requesting to send data that should be transmitted in the user plane. For example, the flag section may include a single bit, that when set (e.g., logic "1"), may indicate that a large data block is expected and that therefore a user plane S1-U/DRB connection should be established. The NAS message may be transmitted, by UE 110, when in connected-mode (i.e., EPS Connected Management (ECM)-CONNECTED mode and/or EPS Connection Management (EMM)-CONNECTED mode). In some implementations, the particular message may also include an IE that can be used to transmit user data as part of Control Plane CIoT EPS Optimization. For example, the particular message may include an EPS Session Management (ESM) IE, such as the "ESM Message Container" IE, that may carry substantive data. In this case, the message may both carry substantive data (in the control plane) and provide the indication to switch to user plane data transfer.

Process 300 may further include, in response to reception of the "large data" flag, setting up of a S1-U/DRB connection (block 340). The S1-U/DRB connection may be used to transmit data via the user plane. MME 142 may initiate the setup of the S1-U/DRB connection, between UE 110 and SGW 144, by signaling towards the SGW 144. The S1-U/DRB connection may subsequently be used to transmit data, for UE 110 (e.g., as shown in FIG. 2 at 245).

Figure 4:
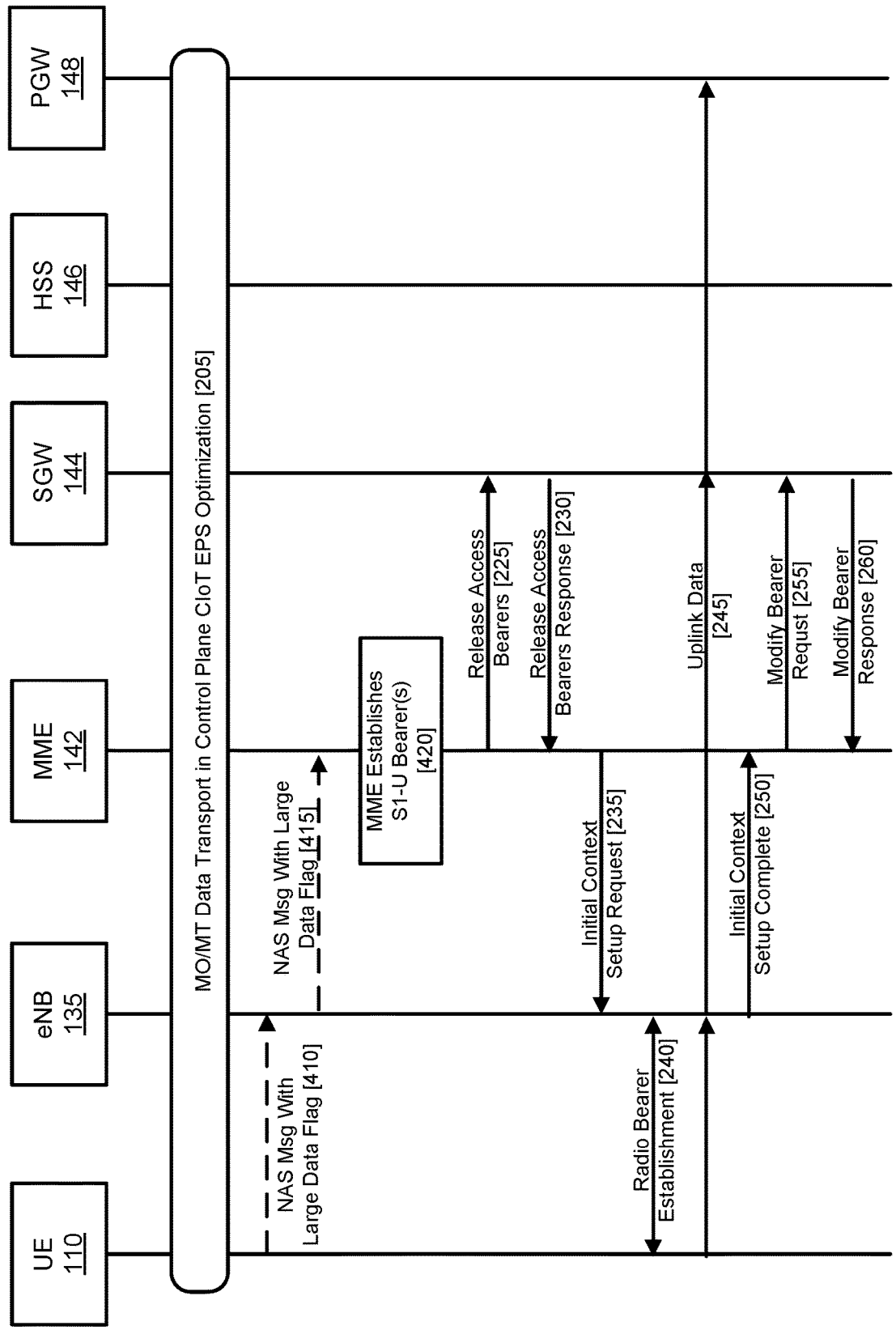
FIG. 4 is a diagram illustrating an example signaling sequence to implement the technique of FIG. 3.

FIG. 4 is a diagram illustrating an example signaling sequence, to implement the technique of FIG. 3, for enabling switching from data transfer using Control Plane CIoT EPS Optimization to data transfer using the user plane. For brevity, operations in FIG. 4 that are similar to that of FIG. 2 may be indicated using like reference numbers and may not be discussed in detail.

As shown in FIG. 4, UE 110 may be engaged in mobile originated (MO) and/or mobile terminated (MT) data communication using the control plane (at 205). The data communications may be particularly implemented, in the control plane, using the Control Plane CIoT EPS Optimization.

At some point, UE 110 may determine to communicate the user data using user plane communications (e.g., via user plane data transfer). The switch from the Control Plane CIoT EPS Optimization to user plane data transfer may be signaled using an EMM NAS message that includes an IE that includes a flag (a "large data" flag) that, when set, indicates that user plane data transfer should be used to transmit a relatively large amount of data. The NAS message, with the large data flag, may be transmitted from UE 110 to eNB 135 (at 410), and then forwarded to MME 142 (at 415). The NAS message may be transmitted while UE 110 is in ECM-CONNECTED mode. When MME 142 receives the NAS message, MME 142 may, based on the "large data" flag being set, establish S1-U bearers to execute the data transfer for UE 110 (at 420, and at 225-260).

An example NAS EMM message that includes a "large data" flag, such as the NAS message discussed above with respect to block 330, is illustrated in Table I, below. As shown in Table I, the message may be referred to as a "Data Service Request" message. It can be appreciated that the particular name of the message is arbitrary and other message names could be used. In Table I, the row(s) indicated in bold may include information that is added to the 3GPP TS 24.301 specification. As shown in Table I, the IE "Large Data Indication" may be an information element that includes an information element identifier (IEI) "E-" (as defined in 3GPP TS 24.007 and 3GPP TS 24.301), a presence requirement of "O" ("optional", as defined in 3GPP TS 24.007), format "TV" (as defined in 3GPP TS 24.007), and length (in bytes) of one. The Large Data Indication IE may be included in the Data Service Request message, by UE 110, when the UE has large data to send to the network. Large Data Indication flag may indicate to MME 142 that S1-U/DRBs shall be established.

TABLE I

| | Data Service Request | | | | |
|---|---|---|---|---|---|
| IEI | IE | Type/Reference | Presence | Format | Length |
| | Protocol Discriminator | Protocol Discriminator 9.2 | M | V | ½ |
| | Security header type | Security header type 9.3.1 | M | V | ½ |
| | Data service request message identity | Message type 9.8 | M | V | 1 |
| | Data service type | Data service type 9.9.3.21 | M | V | ½ |
| | NAS key set identifier | NAS key set identifier 9.9.3.21 | M | V | ½ |

TABLE I-continued

Data Service Request

| IEI | IE | Type/Reference | Presence | Format | Length |
|---|---|---|---|---|---|
| | ESM message container | ESM message container 9.9.3.15 | M | LV-E | 2-n |
| 57 | EPS bearer context status | EPS bearer context status 9.9.2.1 | O | TLV | 4 |
| D- | Device Properties | Device properties 9.9.2.0A | O | TV | 1 |
| E- | Large Data Indication | Large Data Indication 9.9.2.XX | O | TV | 1 |

Table II illustrates an example implementation of the Large Data Indication (from Table I) in additional detail. As shown, the Large Data Indication may be an eight bit (one byte) field in which bits 5-8 are used for the Information Element Identifier (WI) value, bits 2-4 are unused (spare), and bit one is used for the Large Data Expected (LDX) flag. The LDX flag may be set to "1" when large data is expected (and thus S1-U/DRB connection should be established) and "0" otherwise.

TABLE II

Large Data Indication IE

| bit 8 | bit 7 | bit 6 | bit 5 | bit 4 | bit 3 | bit 2 | bit 1 |
|---|---|---|---|---|---|---|---|
| Large Data Indication IEI | | | | 0 Spare | 0 Spare | 0 Spare | LDX |

A second embodiment for switching from data transfer using Control Plane CIoT EPS Optimization to transfer data using the user plane will next be described. In this embodiment, a Tracking Area Update (TAU) message may be used, by UE 110, to indicate that UE 110 is to switch from data transfer using Control Plane CIoT EPS Optimization to data transfer using the user plane.

Figure 5:
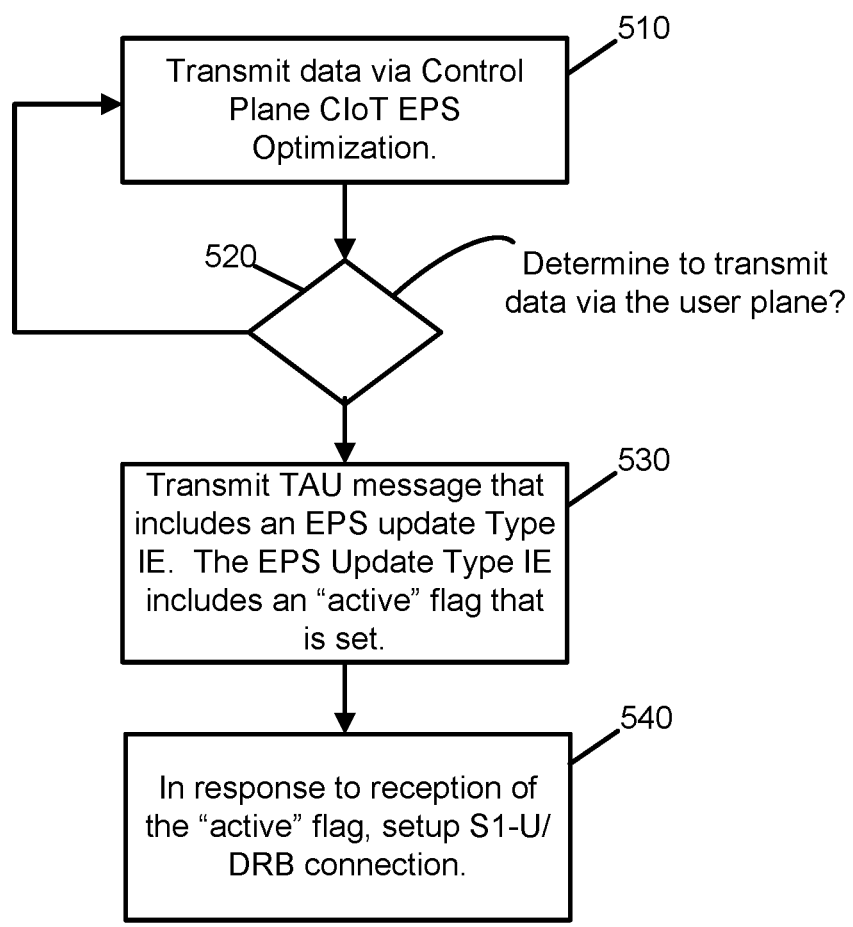
FIGS. 5 and 6 are additional flowcharts illustrating example processes relating to switching from data transfer using Control Plane CIoT EPS Optimization to data transfer using the user plane, according to the additional embodiments.

FIG. 5 is a flowchart illustrating an example process 500 relating to switching (or simultaneously using) from data transfer using Control Plane CIoT EPS Optimization to data transfer using the user plane, according to the second embodiment. Process 500 may be performed by, for example, UE 110 in conjunction with MME 142.

Initially, a UE may be transmitting data via Control Plane CIoT EPS Optimization (block 510). At some point, the UE may determine to transition to transmitting data using user plane data transfer (block 520). For example, UE 110 may determine that, based on the amount of data that is to be transmitted by UE 110, performing the data transmission using user plane data transfer would be more efficient. Alternatively or additionally, the decision to transition from using Control Plane CIoT EPS Optimization to user plane data transfer may be made by a device other than the UE. For example, a network device, such as MME 142 or SGW 144 may make the decision.

Process 500 may further include transmitting a TAU message that includes an "active" flag that is set to indicate that the UE is requesting to send data that should be transmitted in the user plane (block 530). The "active" flag may be a designated bit in the EPS Update Type information element (block 530). The active flag may include a single bit, that when set (e.g., logic "1"), may indicate that a large data block is expected and that therefore a user plane S1-U/DRB connection should be established. The TAU message may be transmitted, by UE 110, when in connected-mode (i.e., EMM-CONNECTED mode).

Process 500 may further include, in response to reception of the "active" flag, setting up of a S1-U/DRB connection (block 540). The S1-U/DRB connection may be used to transmit data via the user plane. MME 142 may initiate the setup of the S1-U/DRB connection, between UE 110 and SGW 144, by signaling towards the SGW 144. The S1-U/DRB connection may subsequently be used to transmit data, for UE 110 (e.g., as shown in FIG. 2 at 245).

A third embodiment for switching from data transfer using Control Plane CIoT EPS Optimization to data transfer using the user plane will next be described. In this embodiment, an ESM Data Transport message may be defined to include an "active" flag that is used to indicate that UE 110 is to switch from data transfer using Control Plane CIoT EPS Optimization to data transfer using the user plane.

Figure 6:
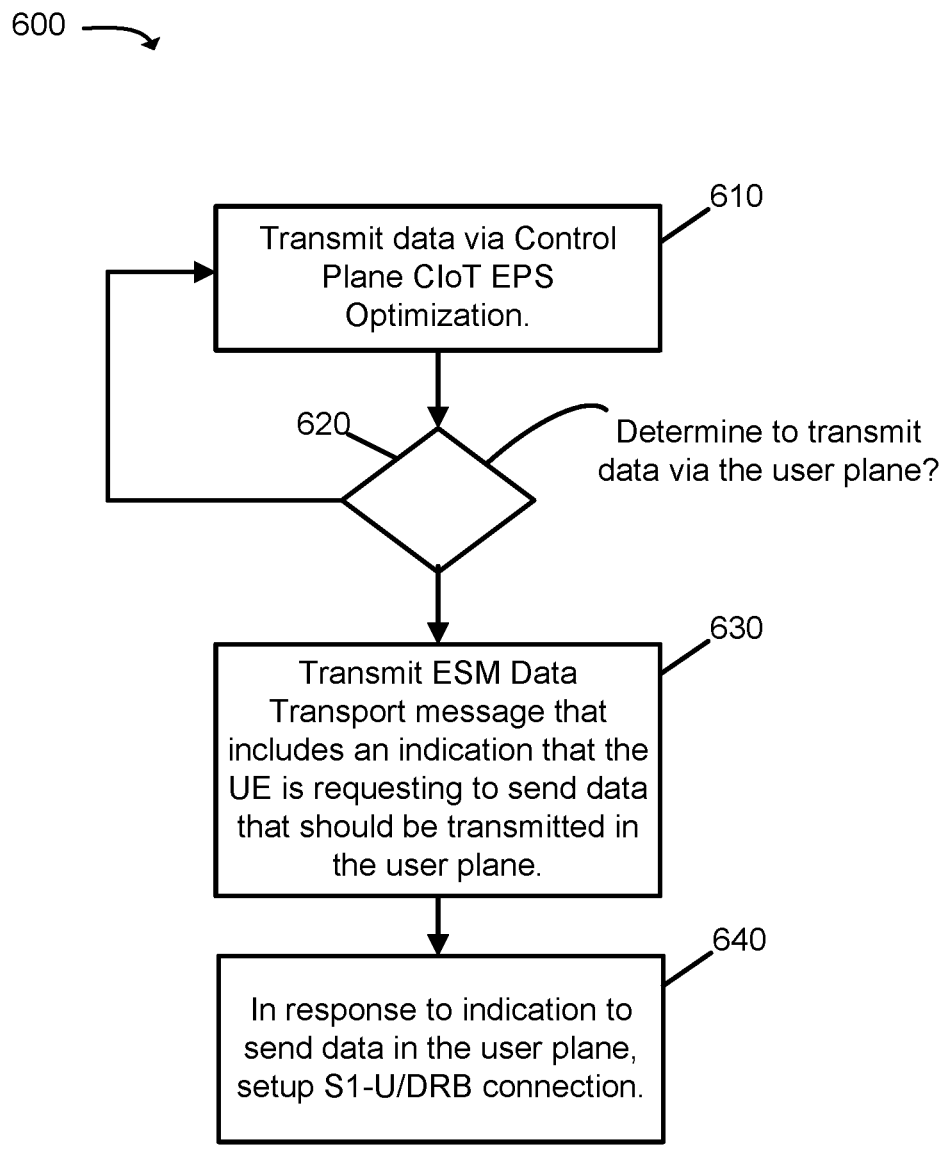

FIG. 6 is a flowchart illustrating an example process 600 relating to switching (or simultaneously using) from data transfer using Control Plane CIoT EPS Optimization to data transfer using the user plane, according to the third embodiment. Process 600 may be performed by, for example, UE 110 in conjunction with MME 142.

Initially, a UE may be transmitting data via Control Plane CIoT EPS Optimization (block 610). At some point, UE may determine to transition to transmitting data using the user plane (block 620). For example, UE 110 may determine that, based on the amount of data that is to be transmitted by UE 110, performing the data transmission using the user plane would be more efficient. Alternatively or additionally, the decision to transition from using Control Plane CIoT EPS Optimization to user plane data transfer may be made by a device other than the UE. For example, a network device, such as MME 142 or SGW 144 may make the decision.

Process 600 may further include transmitting an ESM Data Transport message that includes an indication that the UE is requesting to send data that should be transmitted in the user plane (block 630). The ESM Data Transport message may be defined based on the ESM Data Transport message, as defined in 3GPP TS 24.301. The indication may be implemented via an "active" flag defined as part of the ESM Data Transport message. The active flag may include a single bit (or multiple bits), that when set (e.g., logic "1"), may indicate that a large data block is expected and that therefore a user plane S1-U/DRB connection should be established. Alternatively, the indication may be implemented as a "Large Data Indication" IE that is defined in a manner similar to the Large Data Indication IE that was discussed with respect to the first embodiment.

Process 600 may further include, in response to reception of the indication that the UE is requesting to send data that should be transmitted in the user plane, setting up of a S1-U/DRB connection (block 640). The S1-U/DRB connection may be used to transmit data via the user plane. MME 142 may initiate the setup of the S1-U/DRB connection, between UE 110 and SGW 144, by signaling towards the SGW 144. The S1-U/DRB connection may subsequently be used to transmit data, for UE 110 (e.g., as shown in FIG. 2 at 245).

An example ESM Data Transport message that includes a "Large Data Indication" IE, is illustrated in Table III, below. In Table III, the row(s) indicated in bold may include information that is added to the 3GPP TS 24.301 specification. As shown in Table III, the IE "Large Data Indication" may be an information element that includes an information element identifier (IEI) "E-" (as defined in 3GPP TS 24.007 and 3GPP TS 24.301), a presence requirement of "O"

("optional" as defined in 3GPP TS 24.007), format "TV" (as defined in 3GPP TS 24.007), and length (in bytes) of one. The Large Data Indication IE may be included in the ESM Data Transport message, by UE 110, when the UE has large data to send to the network. The Large Data Indication IE may indicate to MME 142 that S1-U/DRBs shall be established.

TABLE III

ESM Data Transport

| IEI | IE | Type/Reference | Presence | Format | Length |
|---|---|---|---|---|---|
| | Protocol Discriminator | Protocol Discriminator 9.2 | M | V | ½ |
| | EPS bearer identity | EPS bearer identity 9.3.2 | M | V | ½ |
| | Procedure transaction identity | Procedure transaction identity 9.4 | M | V | 1 |
| | ESM data transport message identity | Message type 9.8 | M | V | 1 |
| | User data container | User data container 9.9.4.XY | M | LV-E | 2-n |
| E- | Large Data Indication | Large Data Indication 9.9.2.XX | O | TV | 1 |

A fourth possible embodiment for switching from data transfer using Control Plane CIoT EPS Optimization to data transfer using the user plane will next be described. In this embodiment, a new ESM message may be defined. The new message may indicate that UE 110 is to switch from data transfer using Control Plane CIoT EPS Optimization to data transfer using the user plane. The message will be referred to herein as an "ESM Large Data Notification" message.

An example implementation of the ESM Large Data Notification, is illustrated in Table IV, below. As shown in Table IV, the IE "Large Data Indication" may be an information element that includes an information element identifier (IEI) "E-" (as defined in 3GPP TS 24.007 and 3GPP TS 24.301), a presence requirement of "O" ("optional"), format "TV", and length (in bytes) of one. The Large Data Indication IE may be used to indicate, to MME 142, that S1-U/DRBs shall be established. Alternatively, the ESM Large Data Notification (i.e., the message itself) may be used to indicate that that S1-U/DRBs shall be established, and the Large Data Indication IE may thus not be necessary. Other IEs, that may potentially be included in the ESM Large Data Notification message, as shown in Table IV, may include a "Protocol Discriminator" IE (as described in section 9.2 of 3GPP TS 24.301), an "EPS Bearer Identity" IE (as described in section 9.3.2 of 3GPP TS 24.301), a "Procedure Transaction Identity" IE (as described in section 9.4 of 3GPP TS 24.301), and an "ESM Large Data Notification Message Identity" IE (as described in section 9.8 of 3GPP TS 24.301).

TABLE IV

ESM Large Data Notification

| IEI | IE | Type/Reference | Presence | Format | Length |
|---|---|---|---|---|---|
| | Protocol Discriminator | Protocol Discriminator 9.2 | M | V | ½ |
| | EPS bearer identity | EPS bearer identity 9.3.2 | M | V | ½ |
| | Procedure transaction identity | Procedure transaction identity 9.4 | M | V | 1 |

TABLE IV-continued

ESM Large Data Notification

| IEI | IE | Type/Reference | Presence | Format | Length |
|---|---|---|---|---|---|
| | ESM Large Data Notification message identity | Message type 9.8 | M | V | 1 |
| E- | Large Data Indication | Large Data Indication 9.9.2.XX | O | TV | 1 |

As used herein, the term "logic," "circuitry" or "processing circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 7:
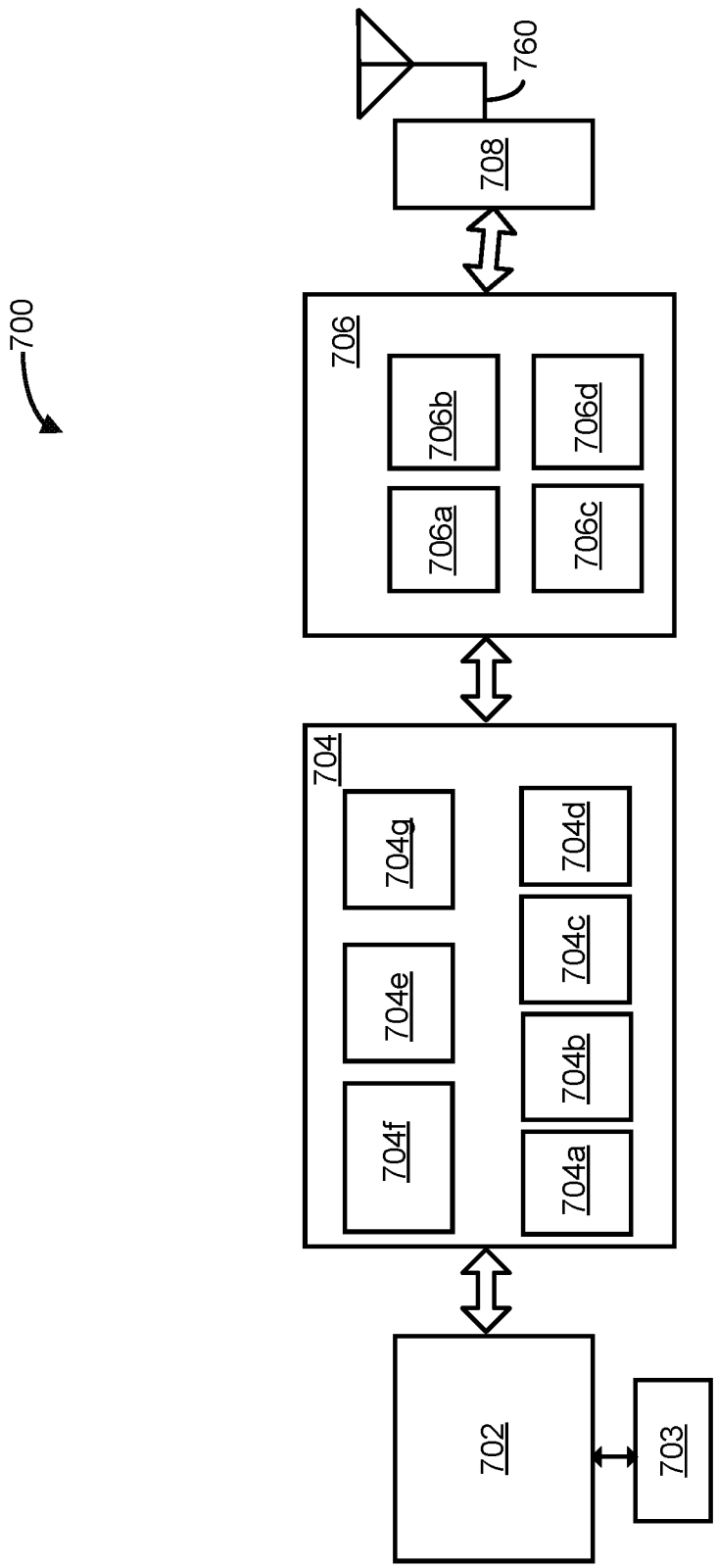
FIGS. 7 and 8 illustrate, for some embodiments, example components of an electronic device.

Embodiments described herein may be implemented into a system using any suitably configured hardware and/or software. FIG. 7 illustrates, for one embodiment, example components of an electronic device 700. In embodiments, the electronic device 700 may be a mobile device, a RAN node, a network controller, a subscription repository, a data gateway, a service gateway, or an application server. In some embodiments, the electronic device 700 may include application circuitry 702, baseband circuitry 704, Radio Frequency (RF) circuitry 706, front-end module (FEM) circuitry 708 and one or more antennas 760, coupled together at least as shown. In embodiments in which a radio interface is not needed for electronic device 700 (e.g., a data gateway, network controller, etc.), the RF circuitry 706, FEM circuitry 708, and antennas 760 may be omitted. In other embodiments, any of said circuitries can be included in different devices.

Application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system. The memory/storage may include, for example, computer-readable medium 703, which may be a non-transitory computer-readable medium. Application circuitry 702 may, in some embodiments, connect to or include one or more sensors, such as environmental sensors, cameras, etc.

Baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a second generation (2G) baseband processor 704a, third generation (3G) baseband processor 704b, fourth generation (4G) baseband processor 704c, and/or other baseband processor(s) 704d for other existing generations, generations in development or to be developed in the future (e.g., fifth generation (5G), 7G, etc.). The baseband circuitry 704 (e.g., one or more of baseband processors 704a-d) may handle various radio control functions that enable communication with one or more radio networks via the RF circuitry 706. The radio control functions may include, but are not limited to, signal modulation/demodulation, encoding/decoding, radio frequency shifting, etc. In some implementations, the functionality of baseband circuitry 704 may be wholly or partially implemented by memory/storage devices configured to execute instructions stored in the memory/storage. The memory/storage may include, for example, a non-transitory computer-readable medium 704h.

In some embodiments, modulation/demodulation circuitry of the baseband circuitry 704 may include Fast-Fourier Transform (FFT), precoding, and/or constellation mapping/demapping functionality. In some embodiments, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), radio resource control (RRC) elements, and/or Non-Access Stratum (NAS) elements. A central processing unit (CPU) 704e of the baseband circuitry 704 may be configured to run elements of the protocol stack for signaling of the PHY, MAC, RLC, PDCP and/or RRC layers, and/or NAS. In some embodiments, the baseband circuitry may include one or more audio digital signal processor(s) (DSP) 704f. The audio DSP(s) 704f may be include elements for compression/decompression and echo cancellation and may include other suitable processing elements in other embodiments.

Baseband circuitry 704 may further include memory/storage 704g. The memory/storage 704g may be used to load and store data and/or instructions for operations performed by the processors of the baseband circuitry 704. Memory/storage 704g may particularly include a non-transitory memory. Memory/storage for one embodiment may include any combination of suitable volatile memory and/or non-volatile memory. The memory/storage 704g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 704g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the RF circuitry 706 may include a receive signal path and a transmit signal path. The receive signal path of the RF circuitry 706 may include mixer circuitry 706a, amplifier circuitry 706b and filter circuitry 706c. The transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals.

Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the embodiments is not limited in this respect.

In some embodiments, the mixer circuitry 706a of the receive signal path and the mixer circuitry 706a of the transmit signal path may include two or more mixers and may be arranged for quadrature down conversion and/or up conversion respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct down conversion and/or direct up conversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+6 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+6 synthesizer.

In some embodiments, frequency input may be provided by a voltage-controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+6 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 760, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 760.

In some embodiments, the FEM circuitry 708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 760).

In some embodiments, the electronic device 700 may include additional elements such as, for example, memory/storage, display, camera, sensors, and/or input/output (I/O) interface. In some embodiments, the electronic device of FIG. 7 may be configured to perform one or more methods, processes, and/or techniques such as those described herein.

Figure 8:
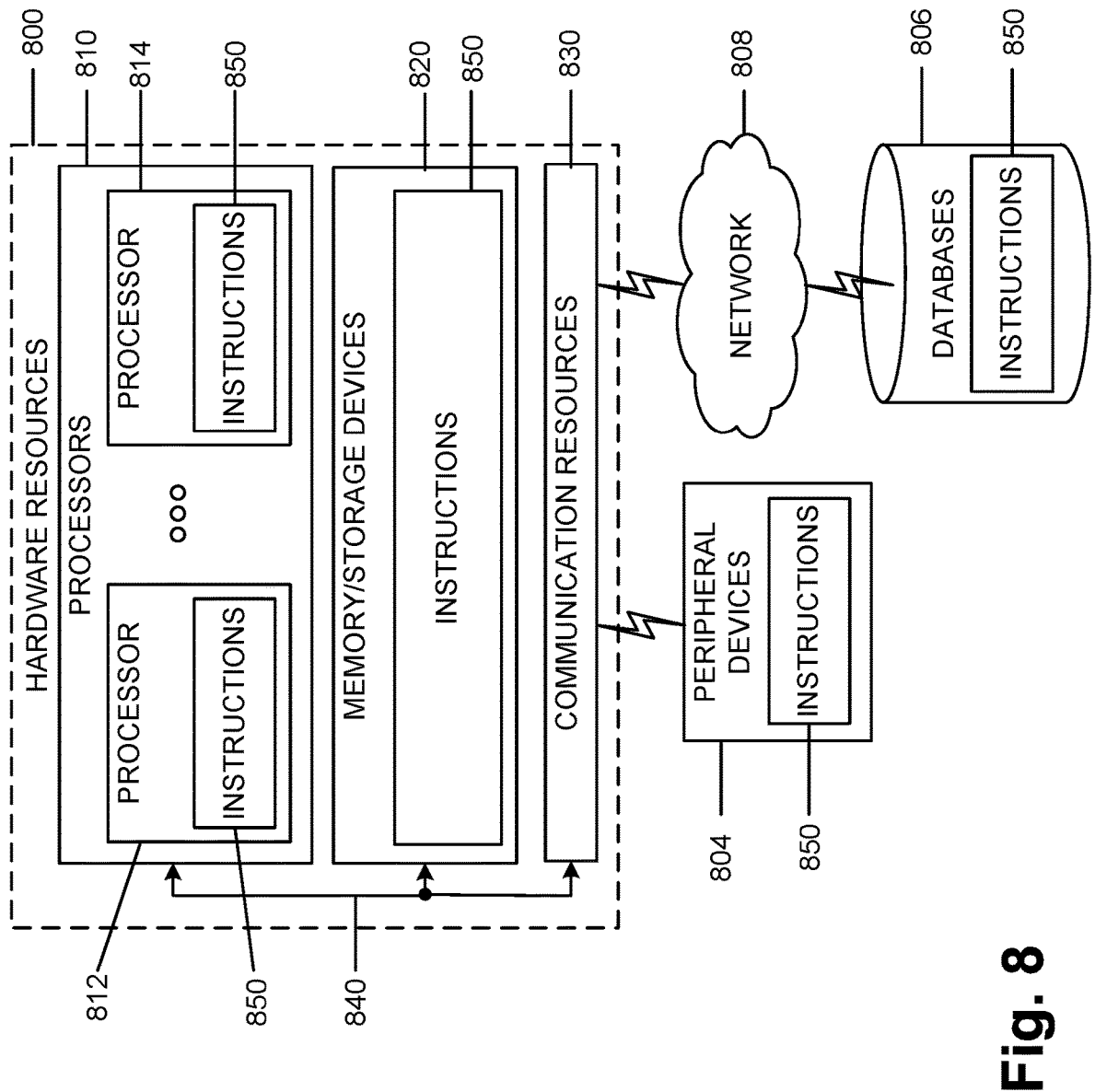

FIG. 8 is a block diagram illustrating components, according to some example embodiments, able to read instructions from a machine-readable or computer-readable medium (e.g., a machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which are communicatively coupled via a bus 840.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814. The memory/storage devices 820 may include main memory, disk storage, or any suitable combination thereof.

The communication resources 830 may include interconnection and/or network interface components or other suitable devices to communicate with one or more peripheral devices 804 and/or one or more databases 806 via a network 808. For example, the communication resources 830 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 and/or the databases 806. Accordingly, the memory of processors 810, the memory/storage devices 820, the peripheral devices 804, and the databases 806 are examples of computer-readable and machine-readable media.

A number of examples, relating to implementations of the techniques described above, will next be given.

In a first example, User Equipment (UE) for a cellular communication network may include a computer-readable medium storing processing instructions; and circuitry to, based on execution of the processing instructions: control transmission of user data via Non-Access-Stratum (NAS) control plane protocol data units (PDUs) using Control Plane Cellular Internet of Things (CIoT) Evolved Packet System (EPS) Optimization; determine, while in a connected mode with the cellular communication network, to transmit user data, via user plane data radio bearers that are to be established for the UE, in the cellular communication network; generate, based on the determination, a NAS message including a single designated bit, within an Information Element (IE) of the NAS message, to signal a request to perform user data transfer using the user plane; and transmit the generated NAS message via the control plane.

In example 2, the subject matter of claim 1, wherein the designated bit represents a flag indicating whether radio bearers are requested.

In example 3, the subject matter of claim 1, or any of the examples herein, wherein the designated bit indicates that the UE is to switch the data transmission from using the Control Plane CIoT EPS Optimization to using the user plane data transmission.

In example 4, the subject matter of example 1, or any of the examples herein, wherein the designated bit indicates that a Mobility Management Entity (MME) is to establish one or more S1-U bearers for the user plane data transmission.

In example 5, the subject matter of examples 1-5, or any of the examples herein, wherein the UE includes a CIoT device and the transmitted user data includes data that is sensed or measured by the UE.

In example 6, the subject matter of examples 1, 2, or 3, or any of the examples herein, wherein the NAS message is transmitted when the UE is operating in EPS Connection Management (EMM)-CONNECTED mode.

In example 7, the subject matter of example 6, or any of the examples herein, wherein the EMM connected mode with the cellular communication network refers to existence of a signaling connection with the cellular network but for which the S1-U bearers and data radio bearers have not been established.

In example 8, the subject matter of examples 1-5, or any of the examples herein, wherein the NAS message additionally includes a second IE that is used to transmit user data.

In example 9, the subject matter of examples 1-5, or any of the examples herein, wherein the transmitted user data includes Mobile Originated Data.

In a tenth example, an apparatus for a baseband processor of User Equipment (UE) for a cellular communication network may comprise a computer-readable medium storing processing instructions; and circuitry to, based on execution of the processing instructions: generate Non-Access-Stratum (NAS) control plane protocol data units (PDUs) to carry user data using Control Plane Cellular Internet of Things (CIoT) Evolved Packet System (EPS) Optimization; determine, while in a connected mode with the cellular communication network, to transmit user data, via user plane data radio bearers that are to be established for the UE, in the cellular communication network; generate, in response to the determination, a second NAS message including a single designated bit, within an Information Element (IE) of the second NAS message, to signal a request to perform user data transfer using user plane data transmission; and control transmission of the second NAS message.

In example 11, the subject matter of example 10, wherein the designated bit represents a flag indicating whether radio bearers are requested.

In example 12, the subject matter of example 10, or any of the examples herein, wherein the designated bit indicates that the UE is to switch the data transmission from using the Control Plane CIoT EPS Optimization to using the user plane data transmission.

In example 13, the subject matter of example 10, or any of the examples herein, wherein the designated bit indicates that a Mobility Management Entity (MIME) is to establish one or more S1-U bearers and data radio bearers for user plane data transmission.

In example 14, the subject matter of examples 10-13, or any of the examples herein, wherein the UE includes a CIoT device and the transmitted user data includes data that is sensed or measured by the UE.

In example 15, the subject matter of examples 10-13, or any of the examples herein, wherein the second NAS message is transmitted when the UE is operating in EPS Connection Management (EMM)-CONNECTED mode.

In example 16, the subject matter of 15, or any of the examples herein, wherein the EMM connected mode with the cellular communication network refers to existence of a signaling connection with the cellular network but for which the S1-U bearers and data radio bearers have not been established.

In example 17, the subject matter of examples 10-12, or any of the examples herein, wherein the second NAS message additionally includes a second IE that is used to transmit user data.

In example 18, the subject matter of examples 10-12, or any of the examples herein, wherein the transmitted data includes Mobile Originated Data.

In a 19$^{th}$ example, a Mobility Management Entity (MME) for a cellular communication network may include a network interface; and logic to: process user data, from Cellular Internet of Things (CIoT) devices, received via the network interface as a Non-Access-Stratum (NAS) control plane protocol data units (PDUs) using Control Plane Cellular Internet of Things (CIoT) Evolved Packet System (EPS) Optimization; process a second NAS message to determine whether the second NAS message includes a flag bit, within an Information Element (IE) of the second NAS message, the flag bit, when set, indicating a request, from User Equipment (UE), to perform user data transfer using the user plane; initiate, in response to the determination that the flag bit is set, establishment of one or more S1-U bearers and data radio bearers for user plane data transmission for the UE.

In example 20, the subject matter of example 19, or any of the examples herein, wherein the flag bit indicates that the UE is to switch data transmission from using the Control Plane CIoT EPS Optimization to using the user plane data transmission.

In example 20, the subject matter of example 19, or any of the examples herein, wherein the second NAS message is received when the UE is in ECM Connected mode.

In example 21, the subject matter of example 19 or 20, or any of the examples herein, wherein the EMM connected mode with the cellular communication network refers to existence of a signaling connection with the cellular network but for which the S1-U bearers and data radio bearers have not been established.

In example 23, the subject matter of examples 19 or 20, or any of the examples herein, wherein the MME further includes circuitry to: process the second NAS message to obtain additional user data embedded within a second IE.

In example 24, the subject matter of examples 19 or 20, or any of the examples herein, wherein the processed user data includes Mobile Originated Data.

In a twenty-fifth example, a computer-readable medium containing program instructions for causing one or more processors, associated with User Equipment (UE) operable with a cellular communication network, to: transmit user data via Non-Access-Stratum (NAS) control plane protocol data units (PDUs) using Control Plane Cellular Internet of Things (CIoT) Evolved Packet System (EPS) Optimization; determine, while in a connected mode with the cellular communication network, to transmit user data via the user plane of the cellular communication network; and transmit, based on the determination, a NAS message including a single designated bit, within an Information Element (IE) of the NAS message, to signal a request to perform user data transfer using the user plane.

In example 26, the subject matter of example 25, or any of the examples herein, wherein the designated bit indicates that the UE is to switch the data transmission from using the Control Plane CIoT EPS Optimization to using the user plane data transmission.

In example 27, the subject matter of example 25, or any of the examples herein, wherein the designated bit indicates that a Mobility Management Entity (MME) is to establish one or more S1-U bearers and data radio bearers for user plane data transmission.

In example 28, the subject matter of examples 25-27, or any of the examples herein, wherein the UE includes a CIoT device and the transmitted user data includes data that is sensed or measured by the UE.

In example 29, the subject matter of examples 25-27, or any of the examples herein, wherein the NAS message is transmitted when the UE is in ECM Connected mode.

In example 30, the subject matter of example 29, or any of the examples herein, wherein the ECM connected mode with the cellular communication network refers to existence of a signaling connection with the cellular network but for which the S1-U bearers and data radio bearers have not been established.

In example 31, the subject matter of examples 25-27, or any of the examples herein, wherein the NAS message additionally includes a second IE that is used to transmit user data.

In example 32, the subject matter of examples 25-27, or any of the examples herein, wherein the transmitted user data includes Mobile Originated Data.

In a $33^{rd}$ example, a method, implemented by User Equipment, may comprise: transmitting user data via Non-Access-Stratum (NAS) control plane messages using Control Plane Cellular Internet of Things (CIoT) Evolved Packet System (EPS) Optimization; determining, while in a connected mode with the cellular communication network, to transmit user data via the user plane of the cellular communication network; and transmitting, based on the determination, a NAS message including a single designated bit, within an Information Element (IE) of the NAS message, to signal a request to perform user data transfer using the user plane.

In example 34, the subject matter of example 33, or any of the examples herein, wherein the designated bit indicates that the UE is to switch the data transmission from using the Control Plane CIoT EPS Optimization to using the user plane data transmission.

In example 35, the subject matter of examples 33, or any of the examples herein, wherein the designated bit indicates that a Mobility Management Entity (MME) is to establish one or more S1-U bearers and data radio bearers for user plane data transmission.

In example 36, the subject matter of examples 33-35, or any of the examples herein, wherein the UE includes a CIoT device and the transmitted user data includes data that is sensed or measured by the UE.

In example 37, the subject matter of examples 33-35, or any of the examples herein, wherein the NAS message is transmitted when the UE is in ECM Connected mode.

In example 38, the subject matter of examples 33-35, or any of the examples herein, wherein the NAS message additionally includes a second IE that is used to transmit user data.

In example 39, the subject matter of examples 33-35, or any of the examples herein, wherein the transmitted user data includes Mobile Originated Data.

In a $40^{th}$ example, a User Equipment (UE) device may comprise means for transmitting user data via Non-Access-Stratum (NAS) control plane messages using Control Plane Cellular Internet of Things (CIoT) Evolved Packet System (EPS) Optimization; means for determining, while in a connected mode with the cellular communication network, to transmit user data via the user plane of the cellular communication network; and means for transmitting, based on the determination, a NAS message including a single designated bit, within an Information Element (IE) of the NAS message, to signal a request to perform user data transfer using the user plane.

In example 41, the subject matter of example 40, or any of the examples herein, wherein the designated bit indicates that the UE is to switch the data transmission from using the Control Plane CIoT EPS Optimization to using the user plane data transmission.

In example 42, the subject matter of example 40, or any of the examples herein, wherein the designated bit indicates that a Mobility Management Entity (MME) is to establish one or more S1-U bearers and data radio bearers for user plane data transmission.

In a $43^{th}$ example, a network device for a cellular communication network, the network device implementing functionality of a Mobility Management Entity (MME) may comprise: a computer-readable medium storing processing instructions; and circuitry to, based on execution of the processing instructions: process user data, from Cellular Internet of Things (CIoT) devices, received via the network interface as a Non-Access-Stratum (NAS) control plane protocol data units (PDUs) using Control Plane Cellular Internet of Things (CIoT) Evolved Packet System (EPS) Optimization; process a second NAS message to determine whether the second NAS message includes a flag bit, within an Information Element (IE) of the second NAS message, the flag bit, when set, indicating a request, from User Equipment (UE), to perform user data transfer using the user plane; and initiate, in response to the determination that the flag bit is set, establishment of one or more S1-U bearers and data radio bearers for user plane data transmission for the UE.

In example 44, the subject matter of example 48, or any of the examples herein, wherein the flag bit indicates that the UE is to switch data transmission from using the Control Plane CIoT EPS Optimization to using the user plane data transmission.

In example 45, the subject matter of example 43 or 44, or any of the examples herein, wherein the second NAS message is received when the UE is in EMM Connected mode.

In example 46, the subject matter of example 43, or any of the examples herein, wherein the EMM connected mode with the cellular communication network refers to existence of a signaling connection with the cellular network but for which the S1-U bearers and data radio bearers have not been established.

In example 47, the subject matter of example 43, or any of the examples herein, wherein the network device further includes circuitry to: process the second NAS message to obtain additional user data embedded within a second IE.

In example 48, the subject matter of example 43 or 44, or any of the examples herein, wherein the processed user data includes Mobile Originated Data.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 2-6, the order of the signals/operations may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. User Equipment (UE) for a cellular communication network, the UE including:
   a computer-readable medium storing processing instructions; and
   circuitry to, based on execution of the processing instructions:
   control transmission of user data via Non-Access-Stratum (NAS) control plane protocol data units (PDUs) using Control Plane Cellular Internet of Things (CIoT) Evolved Packet System (EPS) Optimization;
   determine, while in a connected mode with the cellular communication network, to transmit user data, via user plane data radio bearers that are to be established for the UE, in the cellular communication network;
   generate, based on the determination, a NAS message including
   a single designated bit, within an Information Element (IE) of the NAS message, to signal a request to perform user data transfer using the user plane and indicate whether radio bearers are requested; and
   transmit the generated NAS message via the control plane.

2. The UE of claim 1, wherein the designated bit indicates that the UE is to switch the data transmission from using the Control Plane CIoT EPS Optimization to using the user plane data transmission.

3. The UE of claim 1, wherein the designated bit is set to 1 to indicate that a Mobility Management Entity (MME) is to establish one or more S1-U bearers for the user plane data transmission and the designated bit is set to 0 otherwise.

4. The UE of claim 1, wherein the NAS message is transmitted when the UE is operating in EPS Connection Management (EMM)-CONNECTED mode.

5. The UE of claim 4, wherein the EMM connected mode with the cellular communication network refers to existence of a signaling connection with the cellular network but for which the S1-U bearers and data radio bearers have not been established.

6. The UE of claim 1, wherein the IE comprises an EPS session management IE.

7. The UE of claim 6, wherein the NAS message comprises a Data Service Request message.

8. The UE of claim 6, wherein the NAS message comprises an EPS Mobility Management message.

9. An apparatus for a baseband processor of User Equipment (UE) for a cellular communication network, the apparatus comprising:
   a computer-readable medium storing processing instructions; and
   circuitry to, based on execution of the processing instructions:
   generate Non-Access-Stratum (NAS) control plane protocol data units (PDUs) to carry user data using Control Plane Cellular Internet of Things (CIoT) Evolved Packet System (EPS) Optimization;
   determine, while in a connected mode with the cellular communication network, to transmit user data, via user plane data radio bearers that are to be established for the UE, in the cellular communication network;

generate, in response to the determination, a NAS message including
a single designated bit, within an Information Element (IE) of the NAS message, to signal a request to perform user data transfer using user plane data transmission and indicate whether radio bearers are requested; and
control transmission of the NAS message.

10. The apparatus of claim 9, wherein the designated bit is set to 1 to indicate that a Mobility Management Entity (MME) is to establish one or more S1-U bearers for user plane data transmission and the designated bit is set to 0 otherwise.

11. The apparatus of claim 9, wherein the NAS message is transmitted when the UE is operating in EPS Connection Management (EMM)-CONNECTED mode.

12. The UE of claim 9, wherein the designated bit indicates that the UE is to switch the data transmission from using the Control Plane CIoT EPS Optimization to using the user plane user transmission.

13. A Mobility Management Entity (MME) for a cellular communication network, the MME including:
a network interface; and
logic to:
process user data, from Cellular Internet of Things (CIoT) devices, received via the network interface as a Non-Access-Stratum (NAS) control plane protocol data units (PDUs) using Control Plane Cellular Internet of Things (CIoT) Evolved Packet System (EPS) Optimization;
process a NAS message to determine whether the NAS message includes
a flag bit, within an Information Element (IE) of the NAS message, the flag bit, when set, indicating a request, from User Equipment (UE), to perform user data transfer using the user plane and indicate whether radio bearers are requested;
initiate, in response to the determination that the flag bit is set, establishment of one or more S1-U bearers and data radio bearers for user plane data transmission for the UE.

14. The MME of claim 13, wherein the flag bit indicates that the UE is to switch data transmission from using the Control Plane CIoT EPS Optimization to using the user plane data transmission.

15. The MME of claim 13, wherein the NAS message is received when the UE is in EMM Connected mode.

16. The MME of claim 15, wherein the EMM connected mode with the cellular communication network refers to existence of a signaling connection with the cellular network but for which the S1-U bearers and data radio bearers have not been established.

17. The MME of claim 13, wherein the MME further includes circuitry to:
process the NAS message to obtain additional user data embedded within a second IE.

18. The MME of claim 13, wherein the processed user data includes Mobile Originated Data.

* * * * *